Figure 2:
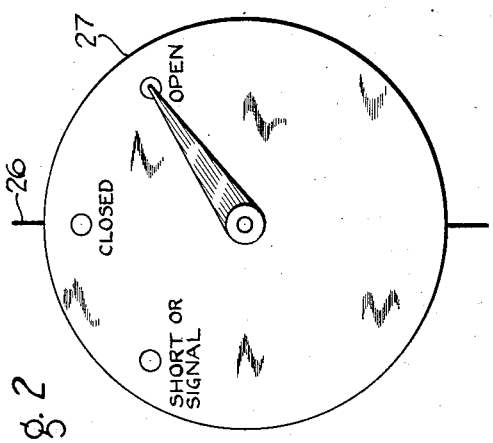

May 26, 1936.    J. C. McCUNE    2,042,115
ELECTROPNEUMATIC BRAKE
Filed May 5, 1934

INVENTOR.
JOSEPH C. McCUNE.
By Wm. M. Cady
ATTORNEY.

Patented May 26, 1936

2,042,115

UNITED STATES PATENT OFFICE 2,042,115

ELECTROPNEUMATIC BRAKE

Joseph C. McCune, Edgewood, Pa., assignor to The Westinghouse Air Brake Company, Wilmerding, Pa., a corporation of Pennsylvania Application May 5, 1934, Serial No. 724,084

14 Claims. (Cl. 303—20)

My invention relates to electro-pneumatic brake equipment for railway vehicles and particularly to means for detecting faults in electric circuits for use in controlling electrically operated brake control mechanisms.

My invention is particularly adapted for use in detecting faults in a direct current, single magnet, two wire electro-pneumatic brake system of the character disclosed in my copending application Case No. 3,222, Serial No. 669,746, filed May 6, 1933, for Electro-pneumatic brakes. In that application a fluid pressure brake equipment is disclosed that may be controlled, either pneumatically by a brake valve in the usual manner of operating fluid pressure brakes, or electrically. For electrical control of the brake equipment a triple valve is employed on each car, and is provided with a single electromagnet valve having two operative positions that serve to control the triple valve. By energizing and deenergizing the magnet valve in a proper sequence of operations, and for regulated periods of time, the electrical triple valve may be moved as desired to the usual operating positions for effecting the several operations of the brakes, such as service application, graduated service application, release, and graduated release of the brakes, as well as lap position wherein the brakes are retained applied.

The brake controlling switch is so arranged that the train wires are energized to produce either a release or a service operation of the brake equipment. The different desired brake operations are accomplished by timing the energization of the magnet valve and the brake controlling switch and by timing the action of the triple valves on the several cars. These timing devices, which are disclosed in my above referred to application, are not disclosed in this application as they form no part of the invention covered herein.

Should the control circuit through the train wires become defective either by breaking of the wires or by a short circuit between the control wires, proper operation of the brake, on at least part of the cars, would be impossible. It is desirable that the train operator should have knowledge of the condition of the control wire circuit prior to making a brake application so that, in the case of a defective electrical circuit, he may employ the brake valve with complete pneumatic control.

It is an object of my invention to provide a protective circuit for an electrically controlled vehicle braking system.

It is another object of my invention to provide for indicating the condition of an electrical brake control circuit.

It is a further object of my invention to provide an indicating and signal system for indicating the condition of a two wire, direct current, electro-pneumatic brake system circuit.

It is a further object of my invention to provide means for employing a two wire direct current circuit for controlling the operation of an electromagnetic brake system as an indicating circuit and as a signal circuit.

Figure 1:
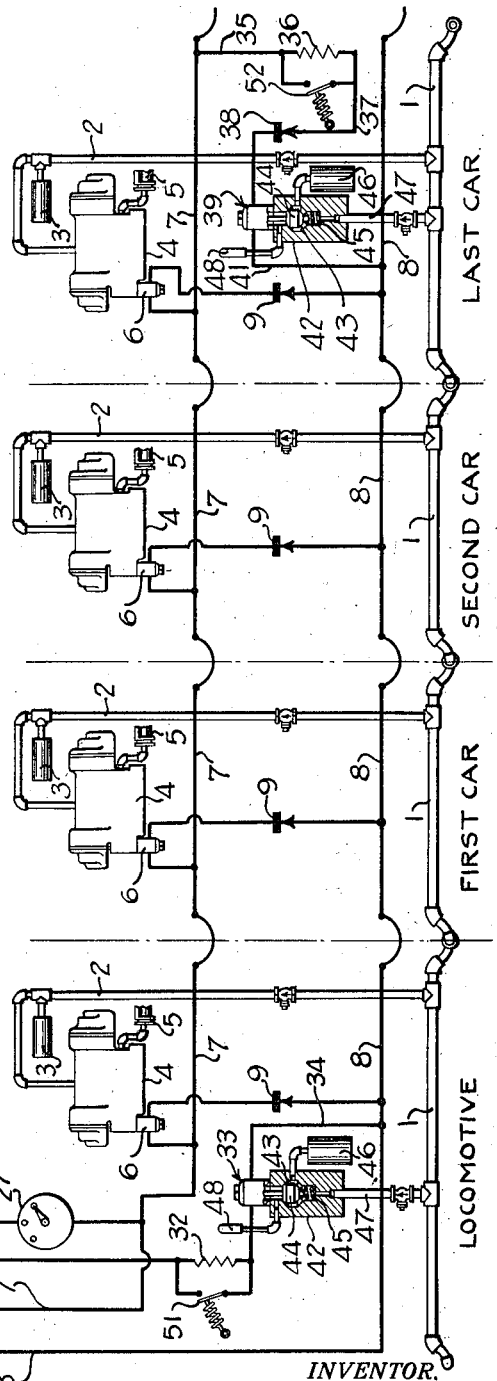
Figure 1:
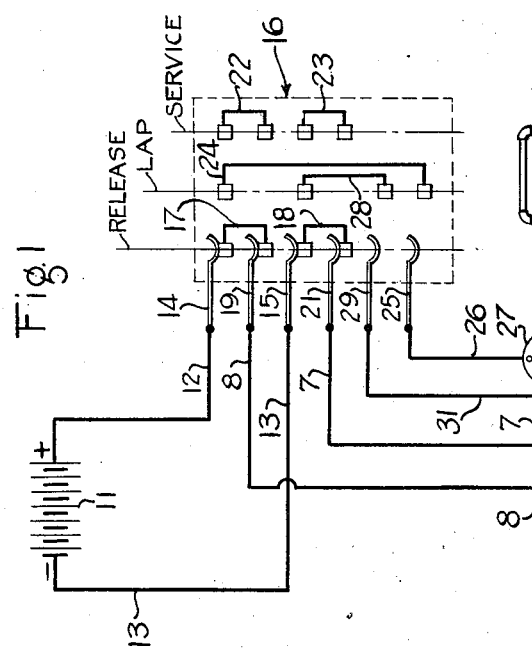

Other objects and advantages of my invention will appear from the following specification of a specific embodiment of my invention when taken in connection with the accompanying drawing in which, Fig. 1 is a diagrammatic view of circuits and apparatus illustrating one preferred embodiment of my invention, and Fig. 2 is a detail of an indicating meter.

Referring to the drawing, Fig. 1 discloses generally the brake mechanism applied to a train comprising a locomotive and three cars. A brake pipe 1 is provided that extends throughout the length of the train, a branch pipe 2 being connected thereto on the locomotive and each of the several cars. Brake pipe pressure is supplied through the branch pipe 2 to the auxiliary reservoir 3 and the triple valve mechanism 4 which controls the application of pressure to the brake cylinder 5 as determined by operation of the magnet valve devices 6.

Electric train wires 7 and 8 are provided extending from the locomotive throughout the length of the train, and between which the operating windings of the several magnetic devices 6, on the several vehicle units, are connected through rectifiers 9 in such manner that the valve is energized only when so connected to a source of direct current energy such that the conductor 8 is positive and the conductor 7 is negative.

A direct current source of energy, such as the battery 11, is provided having its positive terminal connected by a conductor 12 to a finger 14, and its negative terminal connected by a conductor 13, to a finger 15 on the brake switch 16 illustrated in its release position. In the release position of the brake switch 16, the fingers 14 and 15, respectively, are connected by contact segments or jumpers 17 and 18 to the contact fingers 19 and 21, to connect the positive terminal of the battery 11 to the conductor 8 and the negative terminal of the battery 11 to the conductor 7, to energize the windings of the electromagnet valves 6 in such direction that current will pass through the rectifiers 9 and cause operation of the valves. In service position of the brake switch 16, the conducting segments 22 and 23 respectively complete circuits in the same manner as segments 17 and 18 when the switch is in release position.

Upon operation of the brake switch 16 to lap position the finger 14 is connected by the contact member 24 to a finger 25, and by conductor 26, through the electric meter 27 to the wire 7. The finger 15 is connected, through the contact member 28, finger 29, conductor 31, resistor 32 and the winding of an electromagnetic valve device 33, conductor 34, to the train wire 8. The train wires 7 and 8 are now supplied with direct current having a polarity opposite to that which is supplied to them when the brake switch 16 is in its release, or its service position. That is to say, the conductor 7 is now connected to the positive terminal of the battery 11 and the conductor 8 is now connected to the negative terminal of the battery 11. Under this condition the rectifiers 9 prevent the flow of current between conductors 7 and 8 through the windings of the magnet valves 6. In lap position of the switch 16 current will flow from the positive terminal of the battery 11, through switch 16, conductor 26, the indicator 27, to the train wire 7, and to the rear end of the train, then through conductor 35, resistor 36, conductor 37, rectifier 38 and the winding of an electromagnetic valve device 39, conductor 41 to the train wire 8, through train wire 8 to conductor 34, the winding of the electromagnet valve 33, resistor 32, conductor 31, and through the switch 16 to the negative terminal of the battery 11.

The resistance of the resistors 32 and 36 and the resistance of the windings of the electromagnetic valve devices 33 and 39 is sufficiently high that only a very small current will flow through the above traced circuit, which will be insufficient to operate the valve devices 33 and 39. The valve devices 33 and 39 each comprise a casing 42 enclosing a valve chamber 43 in which the valve 44 is positioned and biased upwardly by a spring 45 so as to connect the auxiliary reservoir 46 through the valve chamber and a branch pipe 47 with the brake pipe 1. Upon energization of the electromagnetic valve devices 33 and 39, the valves 44 are urged downwardly closing the connection between the branch pipes 47 and the valve chambers 43 and opening ports connecting the reservoirs 46 to ports in the upper part of the valve chambers to whistles or sound devices 48.

A switch device 51 is provided to close a circuit in shunt relation to the resistor 32 carried on the locomotive. A similar switch 52, normally biased to its open circuit position, is provided in shunt relation to the resistor 36 on the caboose or last car of the train. The resistance of the resistors 32 and 36 is so proportioned that upon operation of either of the switches 51 or 52 to their circuit closing positions, sufficient current will pass through the winding of the electromagnetic valve devices 33 and 39 to operate them. The electromagnetic devices 33 and 39 are therefore arranged to sound an alarm when energized and to transmit signals back and forth through the train upon closing the switches 51 or 52 on the locomotive or on the caboose as required.

The indicating device 27, which is in series with the checking circuit when this brake switch 16 is in lap position, is similar to an electric ammeter and can be arranged to indicate in general, three conditions of the circuit as shown on the dial in Fig. 2. The first position of the ammeter corresponds to an open circuit, in which condition no current would flow through the meter, and is the condition that would exist with a broken train wire, or when the brake switch 16 is in any position other than its lap position. The second or middle position of the indicator corresponds to a closed circuit condition, under which condition a moderate amount of current flows through the meter, as when the circuit is closed with the resistors 32 and 36, and the windings of the electromagnetic devices 33 and 39 included in the circuit. The third or left hand position of the indicator corresponds to a relatively large current flow through the indicating meter, such as would occur upon the occurrence of a short circuit between the train wires 7 and 8, or the closing of one of the switches 51 or 52, in shunt relation to the resistors 32 or 36, respectively.

It will, therefore, be appreciated that the indicator 27 will be effective, in the lap position of the brake switch, to indicate an open circuit condition, a closed circuit condition, or a short circuit condition of the checking circuit. The short circuit condition will also be indicated by the electromagnetic devices 33 and 39, on the locomotive and on the caboose, respectively, to produce a signal to the engineer and trainmen. When the brake switch 16 is in either release or service position, the checking circuit will be open and inactive.

While I have illustrated and described one preferred embodiment of my invention, many modifications thereof will occur to those skilled in the art within the spirit of my invention, and I do not wish to be limited otherwise than by the scope of the appended claims.

Having now described my invention, what I claim as new and desire to secure by Letters Patent, is:

1. In a single magnet two wire direct current electropneumatic brake system, a single electric circuit for controlling the operation of the brakes, means responsive to the application of direct current electric energy of one polarity to said circuit for controlling the operation of the brakes, and means responsive to the application of direct current electric energy of the opposite polarity to said circuit for indicating the operative condition of said circuit.

2. In a single magnet two wire direct current electropneumatic brake system, an electric circuit for controlling the operation of the brakes, means for connecting said circuit to a source of electric energy for operating said brakes, and means including a resistor and an electric meter operative only when said last named means is in a circuit interrupting position for connecting said circuit to a source of electric energy for indicating an operative condition of said circuit.

3. In a single magnet two wire direct current electropneumatic brake system, a single electric circuit for controlling the application and release of the brakes, a direct current source of electric energy, means for connecting said circuit to said direct current source of electric energy with one polarity for operating said brakes, and means for connecting said circuit to said direct current source of electric energy with an opposite polarity for indicating a condition of said circuit.

4. In an electro-pneumatic brake for vehicles, a fluid pressure brake, an electromagnetically operated valve for controlling the operation of said brake, an electric circuit connected thereto, means for permitting the flow of current from said circuit through said electromagnet when energized with one polarity and for preventing the flow of electric current therethrough when energized with the opposite polarity, means for applying direct current electric energy to said circuit in either polarity, and means responsive to the condition of said circuit in said second named polarity for indicating a condition of said circuit.

5. In an electro-pneumatic brake for vehicles, a fluid pressure brake, an electromagnetically operated valve for controlling the operation of said brake, an electric circuit connected thereto, means for permitting the flow of current from said circuit through said electromagnet when energized with one polarity and for preventing the flow of current from said circuit through said electromagnet when energized with the opposite polarity, means for applying direct current energy to said circuit with one polarity to effect release or service operation of said brake, means for applying electrical energy to said circuit with the opposite polarity during lap position of said brake, and means responsive to the connection of said circuit to said source during lap position for indicating a condition of said circuit.

6. In an electro-pneumatic brake for vehicles, a fluid pressure brake, an electromagnetically operated valve for controlling the operation of said brake, an electric circuit connected thereto, control means for said brake system, an electric meter for indicating a condition of said circuit, means responsive to operation of the control means to release or service position for energizing said circuit with a direct current of one polarity, and means responsive to the operation of the control means to lap position for energizing said circuit when a direct current of the opposite polarity and for operatively connecting said meter thereto.

7. In an electro-pneumatic brake for vehicles, a fluid pressure brake, an electrical circuit for controlling the operation of the brakes, means for permitting a control impulse to flow through said circuit when energized with direct current of one polarity and for preventing a control impulse from flowing when energized with an opposite polarity, means effective upon energization of said circuit with a direct current of a polarity ineffective for producing a control impulse for indicating a condition of said circuit, and means for connecting a direct current source to said circuit with either polarity.

8. In an electro-pneumatic brake for vehicles, a fluid pressure brake, a control circuit comprising two conductors extending the length of the train, means for connecting a direct current source of energy to said conductors at one end thereof in either of two polarities, electroresponsive control means connected between said conductors for controlling the operation of said brake, means for permitting a control impulse to flow from the circuit through said electroresponsive control means only when energized with direct current of one polarity, means permitting current to flow between said conductors when energized with an opposite polarity, and means operatively connected to said circuit when so energized for indicating a condition of said circuit.

9. In a railway train brake system, the combination with an electro-pneumatic brake apparatus, of an electrical circuit extending throughout the length of the train and connecting with said apparatus, a source of direct current for energizing said circuit, and means for connecting said source to said circuit in either of two polarities, means for permitting the flow of current through said apparatus only when said circuit is energized in one polarity, and means permitting current to flow through said circuit for indicating the integrity of said circuit when said circuit is energized in the opposite polarity.

10. In a railway train brake system, the combination with an electro-pneumatic brake apparatus, of an electric circuit extending through the length of the train and connecting with said apparatus, means for permitting the flow of current through said apparatus only when said circuit is energized in one polarity, a direct current source of energy, means for connecting said circuit to said source with a polarity to effect operation of said brake apparatus, and means for connecting said circuit through an electric meter to said source in an opposite polarity to establish a checking circuit for indicating the integrity of said control circuit.

11. In a railway train brake system, the combination with an electro-pneumatic brake apparatus, of an electric circuit comprising train wires extending throughout the length of the train and connected to said apparatus, means for permitting the flow of current between said wires through said apparatus only when said circuit is energized in one polarity, a direct current source of energy, a brake control switch, means for connecting said source to said circuit with a control polarity upon operation of said control switch to release or service position, means for connecting said source to said circuit with opposite polarity upon operation of said control switch to lap position to establish a checking circuit, and an electric meter in said checking circuit for indicating the current flow through said circuit.

12. In a railway train brake system, the combination with an electro-pneumatic brake apparatus, of an electric circuit comprising train wires extending throughout the length of the train and connected to said apparatus, means for permitting the flow of current between said wires through said apparatus only when said circuit is energized in one polarity, a direct current source of energy, a brake control switch, means for connecting said source to said circuit with a control polarity upon operation of said control switch to release or service position, means for connecting said source to said circuit with opposite polarity upon operation of said control switch to lap position to establish a checking circuit, an electric meter in said checking circuit for indicating the current flow through said circuit, and electromagnetically controlled signal devices in said checking circuit responsive to predetermined variation in current flow through said checking circuit.

13. In a railway train brake system, the combination with an electro-pneumatic brake apparatus, of an electric circuit comprising train wires extending throughout the length of the train and connected to said apparatus, a source of direct current energy for energizing said circuit, and means for connecting said source to said circuit in either of two polarities, means for permitting the flow of current between said wires through said apparatus only when said circuit is energized in one polarity, means for permitting current to flow between said wires to establish a signal circuit when said circuit is energized with the opposite polarity, and electromagnetically controlled signal devices in said signal circuit responsive to predetermined variations in current flow through said signal circuit.

14. In a railway brake system, the combination with an electro-pneumatic brake apparatus, of an electric circuit comprising train wires extending throughout the length of the train and connected to said apparatus, means for permitting the flow of current between said wires through said apparatus only when said circuit is energized in one polarity, means for permitting current to flow between said wires to establish a signal circuit when said circuit is energized in the opposite polarity, electromagnetically controlled signal devices in said signal circuit responsive to predetermined variations in current flow through said circuit, and means for varying the current flow through said signal circuit at will while operating said signal devices.

JOSEPH C. McCUNE.